United States Patent [19]

Beau

[11] 4,346,949

[45] Aug. 31, 1982

[54] ROTOR ASSEMBLY PROVIDED WITH A BEARING HAVING VIRTUALLY ZERO AXIAL CLEARANCE

[75] Inventor: Jean-François Beau, Saint-Ouen L'Aumone, France

[73] Assignee: Societe Nationale Industrielle Aerospatiale, Paris, France

[21] Appl. No.: 127,833

[22] Filed: Mar. 6, 1980

[30] Foreign Application Priority Data

Mar. 20, 1979 [FR] France .................................. 79 07022

[51] Int. Cl.³ ................................................ H03K 5/22
[52] U.S. Cl. ........................................ 308/236; 310/90
[58] Field of Search ...................... 308/10, 236; 310/90

[56] References Cited

U.S. PATENT DOCUMENTS

| | | | |
|---|---|---|---|
| 2,785,023 | 3/1957 | Naumann | 308/10 |
| 3,016,274 | 1/1962 | Norris | 308/10 |
| 4,043,616 | 8/1977 | Zimmer | 308/10 |
| 4,077,678 | 3/1978 | Studer | 308/10 |
| 4,091,687 | 5/1978 | Meinke | 308/10 |
| 4,167,296 | 9/1979 | Dendy | 308/10 |
| 4,211,452 | 7/1980 | Poubeau | 308/10 |
| 4,223,240 | 9/1980 | Theyse | 308/10 |

Primary Examiner—R. Skudy
Attorney, Agent, or Firm—Merriam, Marshall & Bicknell

[57] ABSTRACT

Rotor assembly comprises a rotor and a bearing having inner and outer races with rolling elements disposed therebetween, one of the races being secured to the rotor and the other thereof being secured to a rotatable annular member concentric with the rotor. Magnetic means secured to each of the races cooperate to take up the axial clearance of the bearing, reducing it to virtually zero.

3 Claims, 2 Drawing Figures

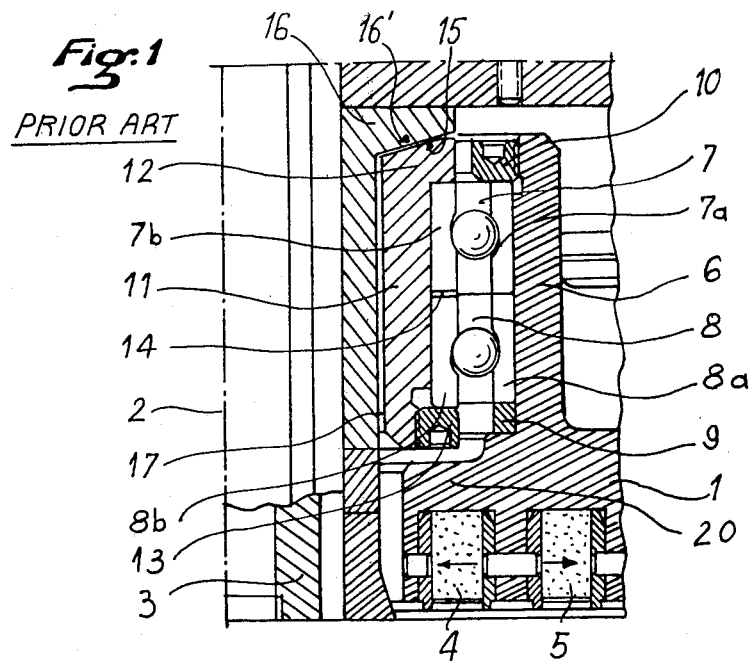
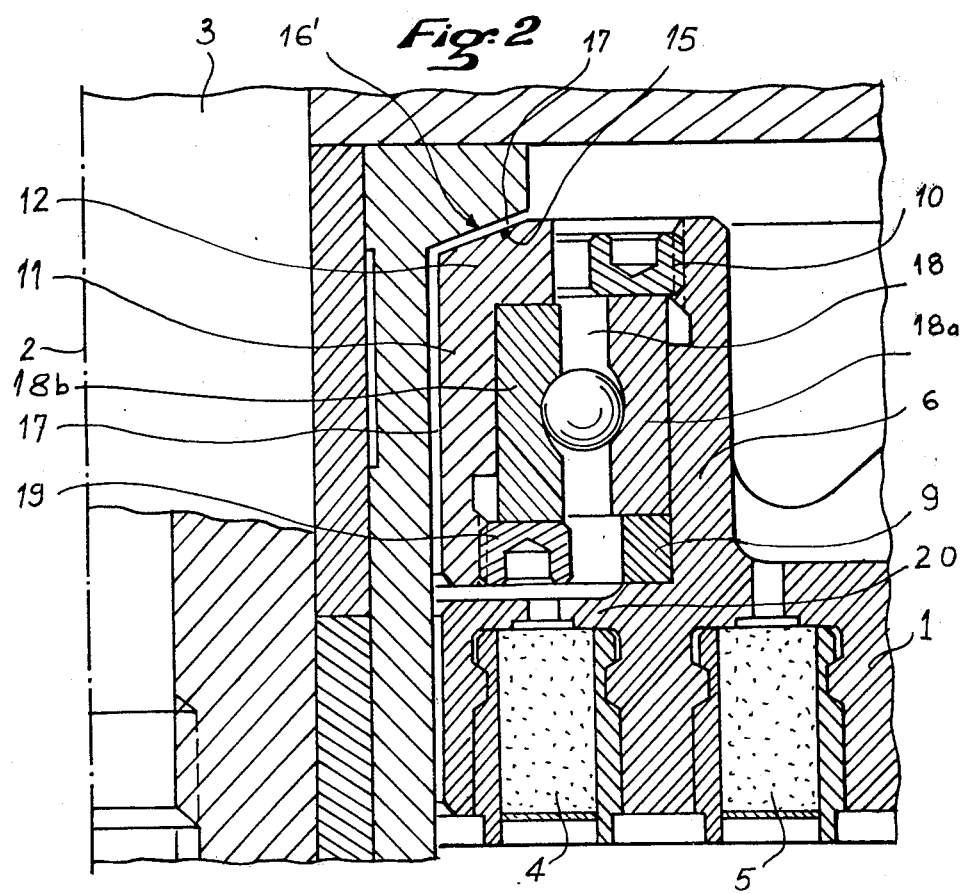

ROTOR ASSEMBLY PROVIDED WITH A BEARING HAVING VIRTUALLY ZERO AXIAL CLEARANCE

The present invention relates to a rotor assembly provided with ball bearing with a virtually zero axial clearance. It will be explained hereinafter more particularly with regard to its application to kinetic inertia wheels, but it is obvious that it is not limited to this application and that it may be carried out each time it is necessary to reduce the axial clearance of a ball bearing as much as possible.

Rotary electric machines are already known which may function as motor or as generator and comprising a rotor forming a kinematic inertia wheel. Such machines are currently called "kinetic wheels" and, due to their low weight and small dimensions, they are often used on board artificial satellites.

Such a rotor is generally mounted idly about its axis of rotation and its axial position on this axis or shaft is maintained due to a suspension with magnetic bearings which maintain air gaps between the rotor and fixed pieces fast with said shaft, said air gaps being located in planes at right angles to said shaft. The rotor is thus suspended between its air gaps. Such air gaps have a width close to 0.6 to 0.7 mm, and being given their unstable nature, it is necessary to provide, in said magnetic bearings, electromagnets whose supply current is regulated so that the width of said air gaps is maintained as constant as possible. Moreover, to avoid the rotor being able to move axially by a sufficient length for it to knock, whilst it is in rotation, against fixed parts of the corresponding kinetic wheel, due to a failure of said magnetic bearings or to unforeseeable operational conditions, this knocking risking deterioration and possibly destruction of said wheel, safety stops are provided. Each of these stops comprises a ball bearing, roller bearing or needle bearing, concentric with respect to the axis of the rotor. A race of said bearing, for example the outer race, is directly fast with the rotor, whilst the other ring of said bearing, for example the inner ring, is fast with a stop member, adapted to cooperate with a complementary stop piece fast with the shaft, when there is considerable axial slide of the rotor. In normal operation, when the rotor is in correct axial position and rotates about its axis, the two races of the bearing rotate with the rotor and virtually no slide occurs between said races, the two cooperating stop pieces then being in spaced apart relationship with repect to each other. On the other hand, if a considerable axial displacement of the rotor occurs, the two stop pieces come into contact with each other to limit the amplitude thereof. At this moment, the inner race of the bearing is prevented from rotating and the rotor rotates about its axis due to the fact that the outer race starts to rotate with respect to the inner ring.

However, for the operation of such safety stops to be correct, it is indispensable for the axial clearance between the two races of the ball bearings to be virtually zero, as the outer races, and therefore the rotor, could otherwise continue their axial displacement, whilst the inner races are already blocked, this rendering the protection of the safety stops illusory.

In an attempt to remedy this drawback, taking into account the fact that the manufacturing tolerances of the ball bearings found on the market did not enable a sufficiently small axial clearance to be obtained, it has already been proposed to mount, in each safety stop, two identical, coupled, concentric ball bearings and to dispose a shim between the inner races of the bearings of each pair thus constituted, enabling these inner races to be spaced apart from each other by a sufficient quantity for the axial cleaarance of said pair of ball bearings to be virtually zero.

Such a solution presents drawbacks. Two ball bearings must be provided per safety stop, this increasing the cost of the whole, whilst introducing a supplementary mass and greater dimensions, whilst, as far as the efforts to be withstood are concerned, one ball bearing would be sufficient. Moreover, this known solution is complicated to produce, as it is necessary to pair the bearings, and to machine and position a shim whose thickness is very often of the order of several hundredths of millimeters.

It is an object of the present invention to provide a technical solution to the problem of producing a rotor assembly provided with a bearing having rolling elements without axial clearance, whilst avoiding the drawbacks of the above-mentioned known solution, as it requires only one bearing.

To this end, according to the invention, the rotor assembly provided with a bearing with rolling elements is noteworthy in that at least one race of said bearing is fast with a magnetic means and said magnetic means is arranged so as to communicate to the races of the bearing a relative spaced apart relationship in the axial direction of the rotor assembly in order virtually to eliminate the axial clearance of said bearing. It is also preferred that one of said magnetic rings serves to connect a rotatable annular stop member to one of the races of the bearing, said stop member being adapted to cooperate with a stop piece associated with and fast with a shaft on which the rotor assembly is mounted for rotation.

The magnetic means are preferably each constituted by a magnetic ring, said magnetic rings being centred on the axis of the bearing and being disposed substantially opposite one another.

If the rotor assembly of the invention is used in a safety stop intended to limit the axial displacement of a rotor which is idly mounted with respect to a shaft and which is fast with one of the rings of the bearing, the other ring thereof being fast with an annular stop piece, through which said shaft passes with clearance and adapted to cooperate with another stop piece fast with the shaft, when the rotor moves axially along said shaft, this rotor assembly is noteworthy in that one of said magnetic rings serves to connect the annular stop piece and the corresponding ring of said bearing.

Moreover, when the rotor is suspended with respect to its shaft by means of at least one magnetic suspension bearing, it is advantageous if one of said magnetic rings forms part of said magnetic bearing.

The invention will be more readily understood on reading the following description with reference to the accompanying drawngs, in which:

FIG. 1 is a partial view, in axial half-section, of a safety stop water assembly for a kinetic inertia wheel of known type.

FIG. 2 is a partial view, likewise in axial half-section, of a safety stop rotor assembly for kinetic inertia wheel according to the invention.

In these Figures, like references designate like elements.

Referring now to the drawings, the safety stop shown in FIG. 1 is intended for a kinetic wheel whose rotor 1 may rotate about the axis 2 of a fixed shsaft 3. The rotor 1 is idly mounted on the shaft 3 and it is maintained in axial position thereon via magnetic bearings of known type. In FIG. 1, only magnetized rings 4 and 5 of a magnetic bearing are visible. The rings 4 and 5 are concentric with respect to the axis 2.

The rotor 1 comprises a sleeve 6 which is fast therewith and concentric with respect to axis 2. In the annular space between the sleeve 6 and the shaft 3 are mounted two superposed identical ball bearings 7 and 8. The outer races 7a and 8a of the bearings 7 and 8 are in abutment on each other and are in contact with the inner wall of the sleeve 6. They are held between a shim 9 and an annular nut 10, screwed in a thread provided in the inner wall of the sleeve 6. The inner races 7b and 8b of the bearings 7 and 8 are covered by an annular stop member in the form of inner ring 11 concentric with respect to the axis 2 and comprising a flange 12 coming into abutment on the edge of the race 7b. Furthermore, at the lower end of inner race 8b, an annular nut 13, screwed in a thread in the outer wall of the ring 11, enables said inner races 7b and 8b to be tightened between it and the flange 12. A shim 14 is disposed between the inner races 7b and 8b to eliminate any axial clearance of the pair of bearings 7, 8.

At its part adjacent the flange 12, stop ring 11 comprises a bevel 15 opposite a complementary bevel 16' of stop piece 16 which is fast with the shaft 3. Apart from the magnetized rings 4 and 5, the different elements of the stop of FIG. 1 are made of a nonmagnetic material.

In normal operation, due to the action of the magnetic bearings, the rotor 1 is maintained in relative axial position with respect to the shaft 3, so that there is an air gap 17, on the one hand between the ring 11 and the shaft 3, on the other hand between the bevels 16 and 15. The rotor 1 may thus rotate freely about the shaft 3. It will be noted that the ring 11 then rotates with the rotor 1, via the ball bearings 7 and 8, whose inner faces 7b and 8b rotate, without slide with respect to the outer races 7a and 8a, about the shaft 3 at the same angular speed as the rest of the rotor. In this mode of operation, the bearings 7 and 8 do not intervene in the rotation of the rotor 1 and serve only as connection between the latter and the ring 11.

If, for any reason, the rotor 1 moves upwardly (cf. FIG. 1), there comes a moment when the bevel 15 comes into contact with bevel 16'. The ring 11, due to the friction which results from contact with stop piece 16, is prevented from rotating with the rotor, which may, however, continue to rotate due to the fact that the ball bearings 7 and 8 then perform their bearing function. Since the shim 14 disposed between the races 7b and 8b, virtually eliminates any axial clearance, the relative displacement of the rotor 1 with respect to the axis 3 stops as soon as the bevels 15 and 16' are in contact with each other. Of course, another safety stop (not shown) is provided on the kinetic wheel which may function in similar manner when the displacement of the rotor 1 is in the opposite direction (downwards in FIG. 1).

As mentioned hereinabove, the safety stop shown in FIG. 1 presents drawbacks which the invention remedies. An example thereof is shown in FIG. 2.

The same elements 1 to 6, 9 to 12 and 15 to 17 are found in FIG. 2, disposed in the same way, except for ball bearings 7 and 8, the annular nut 13 and the shim 14. The pair of bearings 7 and 8 is replaced by a single ball bearing 18, the shim 14 is therefore eliminated and the annular nut 13 is replaced by a threaded ring 19 made of magnetic material. The outer race 18a of the bearing 18 is blocked between the shim 9 and the annular nut 10, whilst the inner race 18b is pressed between the flange 12 and the magnetic ring 19. Furthermore, the radius of the magnetized ring 4 (or 5) and/or the radius of the magnetic ring 19 are preferably chosen so that said rings are at least substantially opposite each other. Moreover, the thickness 20 of the material of the rotor 1 interposed between ring 4 and ring 19 is advantageously reduced with respect to the corresponding thickness of the stop of FIG. 1. Thus, the magnetic leaks of the ring 4 may exert a permanent attraction, insensitive to the effects of gravity, on the magnetic ring 19. The latter being fast with the inner ring 18b, this results in an axial shift between the latter and the outer ring 18a, absorbing the axial clearance of the bearing 18. The safety functioning of the stop of FIG. 2 is similar to that of FIG. 1.

I claim:
1. A rotor assembly comprising:
a rotor adapted for rotation about a shaft;
a bearing comprising inner and outer races concentric with said rotor and rolling members disposed to roll between said races;
one of said races being secured to said rotor and the other thereof being secured to a rotatable annular member concentric with said rotor, said rotor and said annular member being longitudinally relatively displaceable to the extent of the axial clearance of said bearing;
magnetic means secured to each of said rotor and said annular member, which means cooperate to maintain said rotor and said annular member longitudinally displaced by said axial clearance.

2. A rotor assembly in accordance with claim 1, wherein each of said magnetic means is a magnetic ring, said rings being axially displaced and concentric with said rotor.

3. A rotor assembly in accordance with claim 2 wherein said inner race is secured to said annular member through one of said magnetic rings; and
wherein said annular member is adapted to contact a stop piece associated with said shaft to limit axial movement of said rotor assembly along said shaft.

* * * * *

UNITED STATES PATENT AND TRADEMARK OFFICE
CERTIFICATE OF CORRECTION

PATENT NO. : 4,346,949
DATED : August 31, 1982
INVENTOR(S) : JEAN-FRANCOIS BEAU

It is certified that error appears in the above-identified patent and that said Letters Patent are hereby corrected as shown below:

Col. 2, lines 31-36, beginning "It is..." and ending "...for rotation" should be inserted on line 40, after "another".

Col. 2, line 60 "water" should be --rotor--.

Col. 3, line 1, "shsaft" should be --shaft--.

Col. 4, line 12, after "threaded" insert --annular--.

Signed and Sealed this

Seventh Day of December 1982

[SEAL]

Attest:

GERALD J. MOSSINGHOFF

Attesting Officer — Commissioner of Patents and Trademarks